United States Patent
Nakagawa

[11] 3,984,155
[45] Oct. 5, 1976

[54] COMPACT LENS SYSTEM HAVING A LONG BACK FOCAL LENGTH AND A LARGE RELATIVE APERTURE

[75] Inventor: Jihei Nakagawa, Higashi-murayama, Japan

[73] Assignee: Olympus Optical Co., Ltd., Tokyo, Japan

[22] Filed: Feb. 4, 1975

[21] Appl. No.: 547,096

[30] Foreign Application Priority Data
Feb. 14, 1974  Japan............................ 49-17985

[52] U.S. Cl. ............................... 350/215; 350/176
[51] Int. Cl.² .......................................... G02B 9/62
[58] Field of Search ....................... 350/215, 176

[56] References Cited
UNITED STATES PATENTS

| | | | |
|---|---|---|---|
| 3,738,736 | 6/1973 | Shimizu | 350/215 |
| 3,743,387 | 7/1973 | Nakagawa | 350/215 |
| 3,851,953 | 12/1974 | Nakagawa | 350/215 |

Primary Examiner—Paul A. Sacher
Attorney, Agent, or Firm—Cushman, Darby & Cushman

[57] ABSTRACT

A compact lens system comprising six components of seven lenses, having a long back focal length and a large relative aperture, favorably corrected in its aberrations, especially coma, and meeting the conditions enumerated below:

$f_5 > f_6, f_7 > f_6$       1

$0.7 < d_8/d_{10} < 0.8$       2

$0.18f < d_7 + d_8 + d_9 + d_{10} < 0.22f$ $n_1, n_2, n_5 > 1.75$       3

3 Claims, 7 Drawing Figures

SPHERICAL ABERRATION

ASTIGMATISM

DISTORTION

FIG. 3A
SPHERICAL ABERRATION
FIG. 3B
ASTIGMATISM
FIG. 3C
DISTORTION
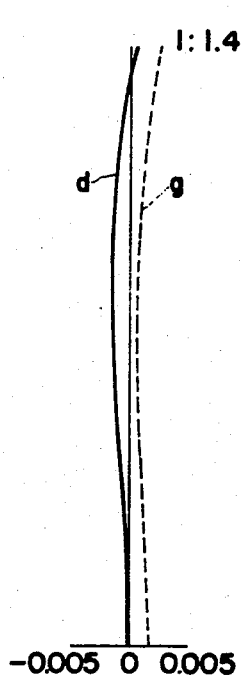
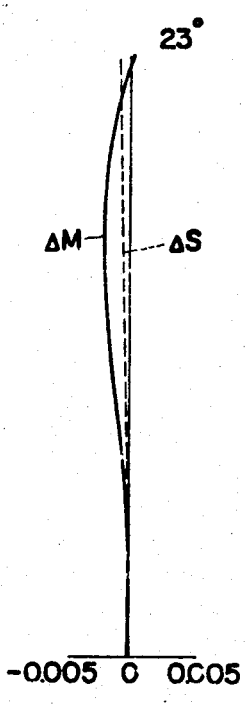
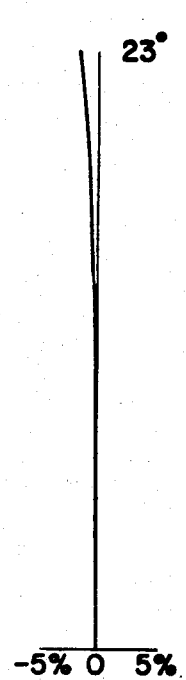

COMPACT LENS SYSTEM HAVING A LONG BACK FOCAL LENGTH AND A LARGE RELATIVE APERTURE

BACKGROUND OF THE INVENTION a. Field of the Invention:

The present invention relates to a variant type of Gauss photographic lens which has a relative aperture of 1 : 1.4 and a field angle of about 45° and which is intended for use with 35 mm single-lens reflex photographic cameras.

b. Description of the Prior Art:

In Gauss lens, the concave surface located immediately after the stop functions to produce spherical aberration, which has conventionally posed a problem to favourably correct the coma caused due to over-correction of said spherical aberration on the concave surface for rays at intermediate field angles. With a view to solving this problem, there have heretofore been designed numerous variants of Gauss lens and, of such variants, Simlar, which is an intermediate type between Sonner and Summar, is known most to those skilled in the art. As is already well known to the public, this type of lens has subsequently been developed into ones having larger relative apertures by replacing the intermediate lens element of the second cemented-truplet component with an air lens (space located between two lenses and functioning as a lens) and by splitting the lens located nearest the image side into two lens elements.

However, such variants and improved types of Gauss lens still have the above-mentioned defact of Gauss lens. In such types of lenses, spherical aberration is minimized by designing the three convex lens elements on the image side so as to meet the condition:

$$f_5 < f_6 < f_7$$

wherein $f_5$, $f_6$ and $f_7$ denote focal lengths of the convex lens elements respectively. However, this condition is never advantageous to eliminate flare though it is effective for minimizing spherical aberration.

SUMMARY OF THE INVENTION

In view of the foregoing, it is a general object of the present invention to provide a compact variant type of Gauss photographic lens in which various aberrations are favourably corrected by designing the three convex lens elements located on the image side so as to meet the following conditions:

$$f_5 > f_6 \text{ and } f_7 > f_6$$

wherein $f_5$, $f_6$ and $f_7$ represent focal lengths of said convex lens elements respectively.

The lens system according to the present invention comprises seven lens elements arranged in six components, i.e., a first positive meniscus lens, a second positive meniscus lens, a third negative meniscus lens, a fourth cemented doublet lens consisting of a negative lens and a positive lens, a fifth positive meniscus lens and a sixth positive lens. When the focal length of the entire lens system is designated by $f$, the focal lengths of the three convex lenses located on the image side, i.e., the lens element of the fourth lens component which is located on the image side, the fifth lens component and the sixth lens component are designated by $f_5$, $f_6$ and $f_7$ respectively, the thicknesses of the lens elements of the fourth lens component and the fifth lens component are designated by $d_7$, $d_8$ and $d_{10}$, the distance as measured from the fourth component to the fifth lens is designated by $d_9$, and the refractive indices of the first lens component, the second lens component and the image side lens element of the fourth lens component are designated by $n_1$, $n_2$ and $n_5$ respectively, the lens system according to the present invention meets the following conditions:

$$f_5 > f_6, f_7 > f_6 \qquad 1$$

$$0.7 < d_8/d_{10} < 0.8 \qquad 2$$

$$0.18f < d_7 + d_8 + d_9 + d_{10} < 0.22f$$

$$n_1, n_2, n_5 > 1.75 \qquad 3$$

The above-mentioned condition (1) is selected for preventing flare due to coma at intermediate field angles. Speaking more concretely, when the focal length $f_6$ of the fifth lens component is made shorter than the focal lengths $f_5$ and $f_7$ of the image side lens element of the fourth lens component and the sixth lens as defined in condition (1) above and the image side surface $r_{11}$ of the fifth lens component is so designed accordingly as to have a shorter radius of curvature, the flare due to coma, especially for upper rays on which problems were conventionally posed, which is produced on the surface $r_7$ of the fourth lens component located nearest the object, ie., the surface immediately after the stop can be corrected more effectively than in any of the conventional lens systems. In addition, correction of spherical aberration can not be unfavourably affected when the interrelation in the focal lengths of the rear lens group is made different from that of the conventional lens systems. By the way, it is not desirable to further change the relation between the focal lengths of the fifth and sixth lens components into $f_6 > f_7$ since this relation will increase spherical aberration.

The lens system according to the present invention is so designed as to have small distance $d_8$ and large distance $d_{10}$ as defined in condition (2) for enhancing the effect of correction of flare due to coma obtained by condition (1). In addition, conditions (1) and (2) serve also for prolonging the back focal length and making the entire lens system more compact. When the relation $d_8/d_{10}$ becomes below the lower limit in condition (2), spherical aberration will be produced and, when said relation exceeds the upper limit in condition (2), flare can not be eliminated effectively. If the relation $d_7 + d_8 + d_9 + d_{10}$ become below the lower limit in condition (2), spherical aberration and astigmatism can not be corrected sufficiently and, when said relation exceeds the upper limit in condition (2), it will be impossible to design the lens system in a compact form and to correct the flare effectively.

The above-mentioned condition (3) is selected for correcting spherical aberration. Spherical aberration will therefore be increased and Petzval's sum can not be made small if this condition is not met.

BRIEF DESCRIPTION OF THE DRAWINGS

FIGS. 2A, 2B, 2C, 3A, 3B and 3C are schematic representations illustrating aberrations in various embodiments of the present invention.

DETAILED DESCRIPTION OF THE PREFERRED EMBODIMENTS

Figure 1:
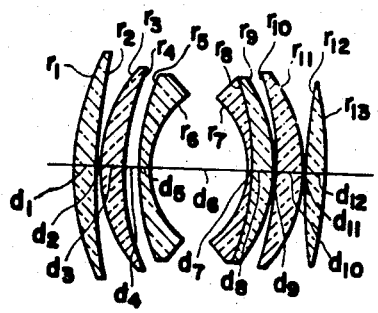
FIG. 1 is a sectional view of the lens system according to the present invention.
Figure 2A:
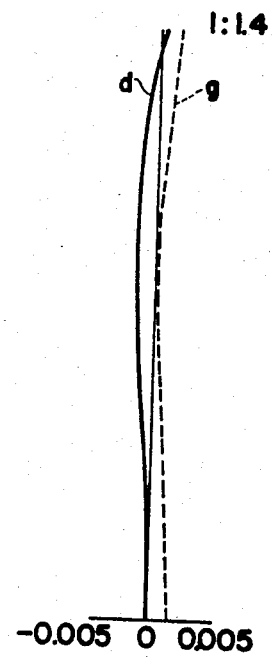
Figure 2B:
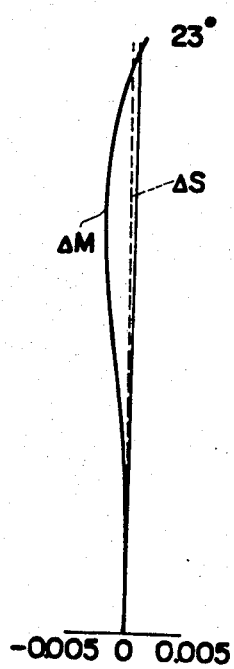
Figure 2C:
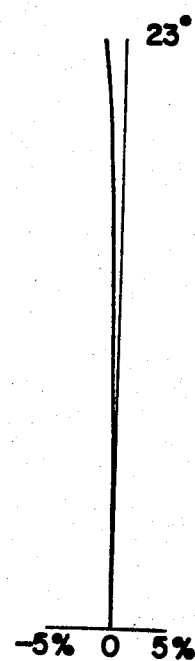

Now, some numerical data of the lens system according to the present invention will be exemplified below:

Embodiment 1

$T_1 = 0.8121$
$d_1 = 0.0772$  $n_1 = 1.8061$  $\nu_1 = 40.9$
$r_2 = 2.9863$
$d_2 = 0.0023$
$r_3 = 0.4397$
$d_3 = 0.0878$  $n_2 = 1.8061$  $\nu_2 = 40.9$
$r_4 = 0.6942$
$d_4 = 0.0454$
$r_5 = 0.8082$
$d_5 = 0.0261$  $n_3 = 1.78472$  $\nu_3 = 25.7$
$r_6 = 0.2900$
$d_6 = 0.3320$
$r_7 = -0.3007$
$d_7 = 0.0261$  $n_4 = 1.78472$  $\nu_4 = 25.7$
$r_8 = -0.7514$
$d_8 = 0.0712$  $n_5 = 1.8061$  $\nu_5 = 40.9$
$r_9 = -0.4770$
$d_9 = 0.0019$
$r_{10} = -0.8043$
$d_{10} = 0.0944$  $n_6 = 1.713$  $\nu_6 = 53.9$
$r_{11} = -0.4347$
$d_{11} = 0.0023$
$r_{12} = 2.0815$
$d_{12} = 0.0616$  $n_7 = 1.713$  $\nu_7 = 53.9$
$r_{13} = -1.6221$
$f = 1.0$
$f_B = 0.7388$
$f/1.4$
$f_5 = 1.452$
$f_6 = 1.199$
$f_7 = 1.288$
$\Sigma d = 0.828$

Embodiment 2

$r_1 = 0.8616$
$d_1 = 0.0740$  $n_1 = 1.8061$  $\nu_1 = 40.9$
$r_2 = 3.0764$
$d_2 = 0.0023$
$r_3 = 0.4190$
$d_3 = 0.0879$  $n_2 = 1.8061$  $\nu_2 = 40.9$
$r_4 = 0.6568$
$d_4 = 0.0454$
$r_5 = 0.7284$
$d_5 = 0.0261$  $n_3 = 1.78472$  $\nu_3 = 25.7$
$r_6 = 0.2785$
$d_6 = 0.3447$
$r_7 = -0.2912$
$d_7 = 0.0265$  $n_4 = 1.78472$  $\nu_4 = 25.7$
$r_8 = -0.7232$
$d_8 = 0.0676$  $n_5 = 1.8061$  $\nu_5 = 40.9$
$r_9 = -0.4339$
$d_9 = 0.0019$
$r_{10} = -0.7859$
$d_{10} = 0.0919$  $n_6 = 1.713$  $\nu_6 = 53.9$
$r_{11} = -0.4251$
$d_{11} = 0.0023$
$r_{12} = 1.8635$
$d_{12} = 0.0577$  $n_7 = 1.713$  $\nu_7 = 53.9$
$r_{13} = -2.2793$
$f = 1.0$
$f_B = 0.7391$
$F/1.4$
$f_5 = 1.219$
$f_6 = 1.174$
$f_7 = 1.446$
$\Sigma d = 0.828$ wherein reference symbols $r_1$ through $r_{13}$ represent radii of curvature of respective lens surfaces, $d_1$ through $d_{12}$ denote thicknesses of respective lenses and distances between respective lenses, $n_1$ through $n_7$ indicate refractive indices of the lenses and $\nu_1$ through $\nu_7$ designate Abbe's number.

Seidel's coefficients of the above-mentioned embodiments will be listed below:

Embodiment 1

| | B | F | C | P | E |
|---|---|---|---|---|---|
| 1 | 0.4614 | 0.1043 | 0.0236 | 0.5496 | 0.1296 |
| 2 | 0.0704 | −0.2158 | 0.6619 | −0.1495 | −1.5718 |
| 3 | 0.0558 | 0.0105 | 0.0020 | 1.0151 | 0.1910 |
| 4 | 0.0622 | −0.2668 | 1.1446 | −0.6429 | −2.1524 |
| 5 | −0.2002 | 0.5407 | −1.4605 | 0.5440 | 2.4754 |
| 6 | −1.6064 | −0.3617 | −0.0815 | −1.5162 | −0.3597 |
| 7 | −2.6614 | 0.8569 | −0.2759 | −1.4622 | 0.5596 |
| 8 | 0.0001 | −0.0008 | 0.0063 | −0.0088 | 0.0208 |
| 9 | 0.2807 | −0.1764 | 0.1108 | 0.9357 | −0.6577 |
| 10 | −0.0284 | 0.0448 | −0.0704 | −0.5175 | 0.9251 |
| 11 | 2.5208 | −0.1401 | 0.0078 | 0.9575 | −0.0536 |
| 12 | −0.0003 | 0.0086 | −0.2316 | 0.2000 | 0.8520 |
| 13 | 1.2047 | −0.3796 | 0.1196 | 0.2566 | 0.1185 |
| Σ | 0.1592 | 0.0247 | −0.0433 | 0.1613 | 0.2398 |

Embodiment 2

| | B | F | C | P | E |
|---|---|---|---|---|---|
| 1 | 0.3864 | 0.1036 | 0.0278 | 0.5180 | 0.1463 |
| 2 | 0.0525 | −0.1761 | 0.5907 | −0.1451 | −1.4946 |
| 3 | 0.2289 | 0.0227 | 0.0023 | 1.0652 | 0.1061 |
| 4 | 0.0320 | −0.1825 | 1.0399 | −0.6795 | −2.0539 |
| 5 | −0.1191 | 0.3955 | −1.3130 | 0.6036 | 2.3350 |
| 6 | −1.9494 | −0.3451 | −0.0643 | −1.5788 | −0.2984 |
| 7 | −2.8592 | 0.8300 | −0.2410 | −1.5099 | 0.5083 |
| 8 | 0.0001 | −0.0008 | 0.0067 | −0.0092 | 0.0210 |
| 9 | 0.5041 | −0.2353 | 0.1098 | 1.0286 | −0.5313 |
| 10 | −0.0521 | 0.0705 | −0.0954 | −0.5296 | 0.8454 |
| 11 | 2.9868 | −0.0698 | 0.0016 | 0.9791 | −0.0229 |
| 12 | −0.0007 | 0.0138 | −0.2649 | 0.2234 | 0.7982 |
| 13 | 0.9561 | −0.3908 | 0.1597 | 0.1826 | −0.1399 |
| Σ | 0.1663 | 0.0268 | −0.0400 | 0.1485 | 0.2392 |

B: a spherical aberration
F: coma
C: Astigmatism
P: Petzval's sum
E: distortion

As is clearly understood from the foregoing descriptions, the present invention provides a compact lens system for photograhic cameras which has long back focal length and large relative aperture and which is capable of correcting aberrations very effectively by making the power distribution for respective lens components in the rear lens group quite different from that of the conventional lens systems.

I claim:

1. A compact lens system having a long back focal length and a large relative aperture comprising a first positive meniscus lens, a second positive meniscus lens, a third negative meniscus lens, a fourth cemented doublet lens component consisting of a negative lens element and a positive lens element, a fifth positive meniscus lens and a sixth positive lens and, satisfying the following conditions $f_5 > f_6, f_7 > f_6$       1

$0.7 < d_8/d_{10} < 0.76$      2

$0.18f < d_7+d_8+d_9+d_{10} < 0.20 f$ $n_1, n_2, n_5$ substantially equal to 1.8      3 wherein $f$ represents the focal length of the entire lens system, $f_5$, $f_6$ and $f_7$ denote focal lengths of the image side lens element of the fourth lens component, the fifth lens and sixth lens, $d_7$, $d_8$, $d_{10}$ designate the thicknesses of the two lens elements of the fourth component and the fifth lens, and $n_1$, $n_2$ and $n_5$ are refractive indices of the first lens, the second lens and the image side lens element of the fourth lens component.

2. A compact lens system having a long back focal length and a large relative aperture comprising a first positive meniscus lens, a second positive meniscus lens, a third negative meniscus lens, a fourth cemented doublet lens component consisting of a negative lens element and a positive lens element, a fifth positive meniscus lens and a sixth positive lens and having following numerical data:

| | | |
|---|---|---|
| $r_1 = 0.8121$ | | |
| $d_1 = 0.0772$ | $n_1 = 1.8061$ | $\nu_1 = 40.9$ |
| $r_2 = 2.9863$ | | |
| $d_2 = 0.0023$ | | |
| $r_3 = 0.4397$ | | |
| $d_3 = 0.0878$ | $n_2 = 1.8061$ | $\nu_2 = 40.9$ |
| $r_4 = 0.6942$ | | |
| $d_4 = 0.0454$ | | |
| $r_5 = 0.8082$ | | |
| $d_5 = 0.0261$ | $n_3 = 1.78472$ | $\nu_3 = 25.7$ |
| $r_6 = 0.2900$ | | |
| $d_6 = 0.3320$ | | |
| $r_7 = -0.3007$ | | |
| $d_7 = 0.0261$ | $n_4 = 1.78472$ | $\nu_4 = 25.7$ |
| $r_8 = -0.7514$ | | |
| $d_8 = 0.0712$ | $n_5 = 1.8061$ | $\nu_5 = 40.9$ |
| $r_9 = -0.4770$ | | |
| $d_9 = 0.0019$ | | |
| $r_{10} = -0.80$ | | |
| $d_{10} = 0.0944$ | $n_6 = 1.713$ | $\nu_6 = 53.9$ |
| $r_{11} = -0.4347$ | | |
| $d_{11} = 0.0023$ | | |
| $r_{12} = 2.0815$ | | |
| $d_{12} = 0.0616$ | $n_7 = 1.713$ | $\nu_7 = 53.9$ |
| $r_{13} = -1.6221$ | | |
| $f = 1.0$ | | |
| $f_B = 0.7388$ | | |
| F/1.4 | | | wherein reference symbols $r_1$ through $r_{13}$ represent radii of curvature of respective lens surfaces, $d_1$ through $d_{12}$ denote thicknesses of respective lenses and distances between respective lenses, $n_1$ through $n_7$ indicate refractive indices of the lenses and $\nu_1$ through $\nu_7$ designate Abb's number.

3. A compact lens system having a long back focal length and a large relative aperture comprising a first positive meniscus lens, a second positive meniscus lens, a third negative meniscus lens, a fourth cemented doublet lens component consisting of a negative lens element and a positive lens element, a fifth positive meniscus lens and a sixth positive lens and having following numerical data:

| | | |
|---|---|---|
| $r_1 = 0.8616$ | | |
| $d_1 = 0.0740$ | $n_1 = 1.8061$ | $\nu_1 = 40.9$ |
| $r_2 = 3.0764$ | | |
| $d_2 = 0.0023$ | | |
| $r_3 = 0.4190$ | | |
| $d_3 = 0.0879$ | $n_2 = 1.8061$ | $\nu_2 = 40.9$ |
| $r_4 = 0.6568$ | | |
| $d_4 = 0.0454$ | | |
| $r_5 = 0.7284$ | | |
| $d_5 = 0.0261$ | $n_3 = 1.78472$ | $\nu_3 = 25.7$ |
| $r_6 = 0.2785$ | | |
| $d_6 = 0.3447$ | | |
| $r_7 = -0.2912$ | | |
| $d_7 = 0.0265$ | $n_4 = 1.78472$ | $\nu_4 = 25.7$ |
| $r_8 = -0.7232$ | | |
| $d_8 = 0.0676$ | $n_5 = 1.8061$ | $\nu_5 = 40.9$ |
| $r_9 = -0.4339$ | | |
| $d_9 = 0.0019$ | | |
| $r_{10} = -0.7859$ | | |
| $d_{10} = 0.0919$ | $n_6 = 1.713$ | $\nu_6 = 53.9$ |
| $r_{11} = -0.4251$ | | |
| $d_{11} = 0.0023$ | | |
| $r_{12} = 1.8635$ | | |
| $d_{12} = 0.0577$ | $n_7 = 1.713$ | $\nu_7 = 53.9$ |
| $r_{13} = -2.2793$ | | |
| $f = 1.0$ | | |
| $f_B = 0.7391$ | | |
| F/1.4 | | | wherein reference symbols $r_1$ through $r_{13}$ represent radii of curvature of respective lens surfaces, $d_1$ through $d_{12}$ denote thicknesses of respective lenses and distances between respective lenses, $n_1$ through $n_7$ indicate refractive indices of the lenses and $\nu_1$ through $\nu_7$ designate Abbe's number.

* * * * *